US009551877B2

(12) United States Patent
Wei

(10) Patent No.: US 9,551,877 B2
(45) Date of Patent: Jan. 24, 2017

(54) GRATING AND DISPLAY DEVICE

(71) Applicant: BOE TECHNOLOGY GROUP CO., LTD., Beijing (CN)

(72) Inventor: Wei Wei, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 80 days.

(21) Appl. No.: 14/420,920

(22) PCT Filed: Apr. 28, 2014

(86) PCT No.: PCT/CN2014/076345
§ 371 (c)(1),
(2) Date: Feb. 11, 2015

(87) PCT Pub. No.: WO2015/109680
PCT Pub. Date: Jul. 30, 2015

(65) Prior Publication Data
US 2015/0309319 A1    Oct. 29, 2015

(30) Foreign Application Priority Data
Jan. 26, 2014  (CN) .......................... 2014 1 0038384

(51) Int. Cl.
G02B 27/22   (2006.01)
G02B 5/18    (2006.01)
H04N 13/04   (2006.01)

(52) U.S. Cl.
CPC ......... *G02B 27/2214* (2013.01); *G02B 5/1842* (2013.01); *G02B 5/1866* (2013.01);
(Continued)

(58) Field of Classification Search
CPC . G02B 27/2214; G02B 5/1866; G02B 5/1842; H04N 13/0447; H04N 13/0425; H04N 13/041
(Continued)

(56) References Cited

U.S. PATENT DOCUMENTS 8,576,484 B2    11/2013 Okamoto
2008/0043092 A1*  2/2008 Evans ................ G02B 27/2214
                                                    348/36
(Continued)

FOREIGN PATENT DOCUMENTS

CN         1912704 A     2/2007
CN       102253443 A    11/2011
(Continued)

OTHER PUBLICATIONS

English translation of the International Search Report of PCT/CN2014/076345 mailed Oct. 27, 2014.
(Continued)

*Primary Examiner* — Scott J Sugarman
*Assistant Examiner* — Mustak Choudhury
(74) *Attorney, Agent, or Firm* — Collard & Roe, P.C.

(57) ABSTRACT

A grating and a display device. The grating (200) comprises periodical cycle arrangements. The first period of the grating is taken as the minimum cycle period and includes two rows of grating structures having same grating pitch and same grating slit width. In the first period, the second row of grating structures are shift to the right or left the distance "c" compared with the first row of grating structures, and the calculation method of "c" is: c=b, in which "b" refers to the width of a sub-pixel in a display panel. The first row of grating structures of the $i_{th}$ period are shift to the right or left the distance "d" compared with the first row of grating structures of the first period, and the calculation method of
(Continued)

US 9,551,877 B2

Page 2

"d" is: d=2(i−1)b, in which i is an integer and i≥2. The grating and the display device can effectively reduce the Moire phenomenon.

7 Claims, 7 Drawing Sheets

(52) U.S. Cl.
CPC ..... *H04N 13/0415* (2013.01); *H04N 13/0425* (2013.01); *H04N 13/0447* (2013.01)

(58) Field of Classification Search
USPC ....... 359/242, 277, 458, 463, 563, 566, 567, 359/569, 572, 558, 577; 348/54, 348, 348/E13.001; 353/7
See application file for complete search history.

(56) References Cited

U.S. PATENT DOCUMENTS

2009/0141122 A1* 6/2009 Hong ................ G02B 27/2214
348/54

2012/0229456 A1  9/2012 Takahashi

FOREIGN PATENT DOCUMENTS

| | | |
|---|---|---|
| CN | 102387384 A | 3/2012 |
| CN | 202720395 U | 2/2013 |
| CN | 103235415 A | 8/2013 |
| CN | 103278954 A | 9/2013 |
| CN | 103513311 A | 1/2014 |
| CN | 203858381 U | 10/2014 |
| JP | 2012128337 A | 7/2012 |
| WO | 2015/109680 A1 | 7/2015 |

OTHER PUBLICATIONS

English translation of the Written Opinion of the International Searching Authority of PCT/CN2014/076345 mailed Oct. 27, 2014.
Chinese Office Action of Chinese Application No. 201410038384.6, mailed Jun. 30, 2015 with English translation.
International Search Report and Written Opinion of the International Searching Authority with Notice of Transmittal of the International Search Report and Written Opinion of PCT/CN2014/076345 in Chinese, mailed Oct. 27, 2014.

* cited by examiner

| 1 | 2 | 3 | 4 | 1 | 2 | 3 | 4 | 1 | 2 | 3 | 4 | 1 | 2 | 3 |
|---|---|---|---|---|---|---|---|---|---|---|---|---|---|---|
| 4 | 1 | 2 | 3 | 4 | 1 | 2 | 3 | 4 | 1 | 2 | 3 | 4 | 1 | 2 |
| 4 | 1 | 2 | 3 | 4 | 1 | 2 | 3 | 4 | 1 | 2 | 3 | 4 | 1 | 2 |
| 3 | 4 | 1 | 2 | 3 | 4 | 1 | 2 | 3 | 4 | 1 | 2 | 3 | 4 | 1 |
| 2 | 3 | 4 | 1 | 2 | 3 | 4 | 1 | 2 | 3 | 4 | 1 | 2 | 3 | 4 |
| 2 | 3 | 4 | 1 | 2 | 3 | 4 | 1 | 2 | 3 | 4 | 1 | 2 | 3 | 4 |
| 1 | 2 | 3 | 1 | 1 | 2 | 3 | 4 | 1 | 2 | 3 | 4 | 1 | 2 | 3 |
| 4 | 1 | 2 | 3 | 4 | 1 | 2 | 3 | 4 | 1 | 2 | 3 | 4 | 1 | 2 |

FIG. 3

GRATING AND DISPLAY DEVICE

CROSS REFERENCE TO RELATED APPLICATIONS

This application is the National Stage of PCT/CN2014/076345 filed on Apr. 28, 2014, which claims priority under 35 U.S.C. §119 of Chinese Application No. 201410038384.6 filed on Jan. 26, 2014, the disclosure of which is incorporated by reference.

TECHNICAL FIELD

Embodiments of the present invention relate to a grating and a display device.

BACKGROUND

A parallax barrier 3D display device comprises a display panel (e.g., a liquid crystal display (LCD) panel) and a parallax bather disposed in front of the display panel or disposed in parallel between the LCD panel and a backlight. The 3D display device alternately displays a left-eye image and a right-eye image on the basis of pixel columns of the display panel in display, and allows a left eye and a right eye to respectively view the left-eye image and the right-eye image displayed in pixels of the display panel by means of the shielding function of the grating sheets of the parallax barrier. More specifically, one frame of 3D image includes two images which are respectively the left-eye image and the right-eye image. When a glasses-free 3D display device displays the 3D image, generally, one part of pixels are adopted to display the left-eye image and the other part of pixels are adopted to display the right-eye image. The left-eye image and the right-eye image are respectively projected to the visible ranges of the left eye and the right eye. The left eye and the right eye of the viewer respectively view the left-eye image and the right-eye image, and hence a 3D display image is produced in the brain of the viewer.

The parallax barrier of the glasses-free parallax barrier 3D display device mainly adopts a slit grating, e.g., a slit grating structure as shown in FIG. 1. As the black matrix (BM) of the display panel and the grating array of the slit grating have different grating pitches, interference will occur when light emitted by each sub-pixel of the display device passes through the black matrix and the grating array, and hence alternately dark and bright stripes as shown in FIG. 1, namely Moire fringes, will be produced. In this situation, the viewer will view severe Moire phenomenon, and hence the 3D display effect can be disadvantageously affected.

SUMMARY

Embodiments of the present invention provide a grating and a display device to solve the problem of severe Moire phenomenon caused when grating structures are applicable for 3D display.

At least one embodiment of the present invention provides a grating, which comprises a periodical cycle arrangement. The first period of the grating is taken as the minimum cycle period and includes two rows of grating structures which have a same grating pitch and a same grating slit width. In the first period, the second row of grating structures are shift to the right by the distance "c" compared with the first row of grating structures, and the calculation method of "c" is: c=b, in which "b" refers to the width of a sub-pixel in a display panel corresponding to the grating. The first row of grating structures of the $i_{th}$ period are shift to the right by the distance "d" compared with the first row of grating structures of the first period, and the calculation method of "d" is: d=2(i−1)b, in which i is an integer and i≥2. Or in the first period, the second row of grating structures are shift to the left by the distance "c" compared with the first row of grating structures, and the calculation method of c is: c=b, in which "b" refers to the width of a sub-pixel in a display panel corresponding to the grating. The first row of grating structures of the $i_{th}$ period are shift to the left by the distance "d" compared with the first row of grating structures of the first period, and the calculation method of "d" is: d=2(i−1)b, in which i is an integer and i≥2.

For instance, in the grating, in the minimum cycle period, a height of the first row of grating structures is one-half a height of the second row of grating structures; or the height of the first row of grating structures is twice the height of the second row of grating structures.

For instance, in the grating, the calculation method of the grating pitch p of the grating is as follows:

$$p = \frac{nbs}{s+h},$$

in which "n" refers to the number of 3D display views; "b" refers to the width of a sub-pixel in the display panel; "s" refers to the distance from the human eye to the grating; and "h" refers to the distance between the grating and a pixel array on the display panel.

For instance, in the grating, the calculation method of the grating slit width k of the grating is as follows:

$$k = \frac{bs}{s+h},$$

in which "b" refers to the width of a sub-pixel in the display panel; "s" refers to the distance from the human eye to the grating; and "h" refers to the distance between the grating and a pixel array on the display panel.

For instance, in the grating, the value range of the grating slit width k is: 0≤k≤p, in which p refers to the grating pitch of the grating.

At least another embodiment of the present invention provides a display device, which comprises the foregoing grating and a display panel comprising the pixel array matched with the grating.

For instance, when the number of 3D display views of the display device is an even number, a centerline of a grating opening of the grating, close to a central position, along the data line direction coincide with a centerline of black matrix of sub-pixels, disposed between a n/2 view and a n/2+1 view, at the central position of the pixel array, in which "n" refers to the number of 3D display views.

For instance, when the number of 3D display views of the display device is an odd number, a centerline of grating openings of the grating, close to a central position, along the data line direction coincide with a centerline of sub-pixels, disposed in a (n+1)/2 view, at the central position of the pixel array, in which "n" refers to the number of 3D display views.

BRIEF DESCRIPTION OF THE DRAWING

Simple description will be given below to the accompanying drawings of the embodiments to provide a more clear understanding of the technical proposals of the embodiments of the present invention. It will be obvious to those skilled in the art that the drawings described below only involve some embodiments of the present invention but are not intended to limit the present invention.

FIG. 3 is a schematic diagram illustrating the arrangement rule of four-view pixels in an embodiment of the present invention;

DETAILED DESCRIPTION

Figure 1:
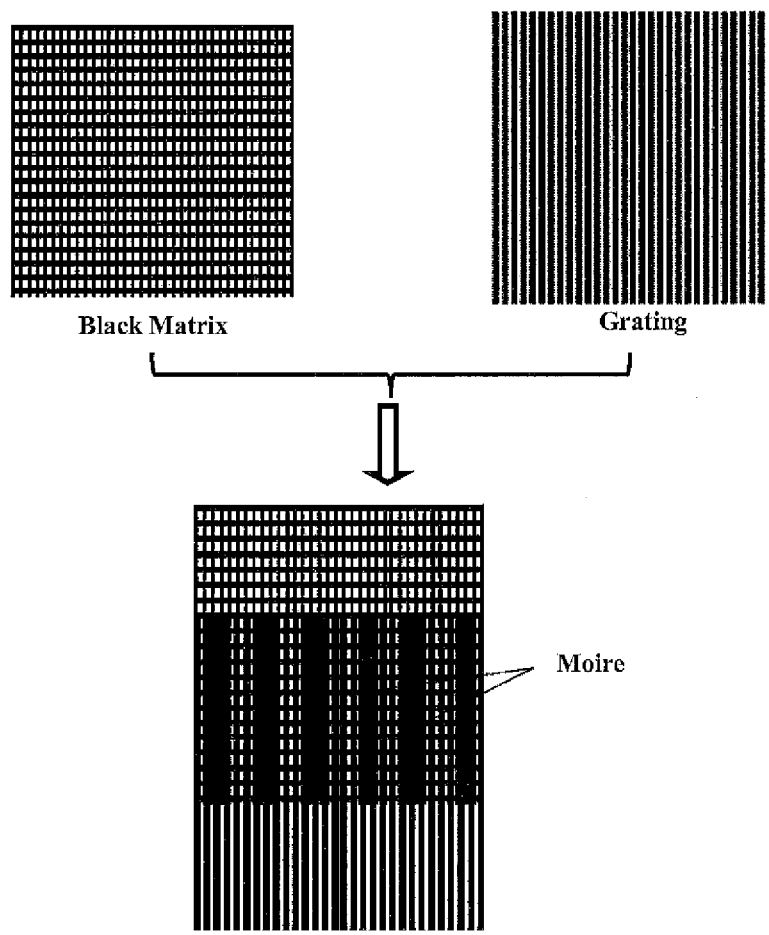
FIG. 1 is a schematic diagram illustrating the process of producing Moire fringes in the case of 3D display.

For better understanding of the present invention, further description will be given below to the present invention with reference to the accompanying drawings and the preferred embodiments.

Unless otherwise specified, the technical terms or scientific terms used herein have normal meanings understood by those skilled in the art. The words "first", "second" and the like used in the present invention do not indicate the sequence, the number or the importance but are only used for distinguishing different components. Similarly, the words "a", "an", "the" and the like also do not indicate the number but only indicate at least one. The word "comprise", "include" or the like only indicates that an element or a component before the word contains elements or components listed after the word and equivalents thereof, not excluding other elements or components. The words "connection", "connected" and the like are not limited to physical or mechanical connection but may include electrical connection, either directly or indirectly. The words "on", "beneath", "left", "right" and the like only indicate the relative position relationship which is correspondingly changed when the absolute position of a described object is changed.

At least one embodiment of the present invention provides a grating, which can be applied in a 3D display device and is disposed in front of, for instance, a corresponding LCD panel or disposed between the LCD panel and a backlight of the LCD panel. The grating comprises periodical cycle arrangements, namely periodical cycle structures. For instance, the first period of the grating is taken as the minimum cycle period and includes two rows of grating structures which have the same grating pitch and the same grating slit width. In the minimum cycle period, the second row of grating structures are shift to the right by the distance "c" compared with the first row of grating structures, and the calculation method of the distance "c" is: c=b, in which "b" refers to the width of a sub-pixel in a display panel corresponding to the grating structure (namely the width of one sub-pixel). The first row of grating structures of the $i_{th}$ period are shift to the right by the distance "d" compared with the first row of grating structures of the first period, and the calculation method of "d" is: d=2(i−1)b, in which "i" is an integer and i≥2, and "b" refers to the width of a sub-pixel in the display panel.

Or in the first period, the second row of grating structures are shift to the left by the distance "c" compared with the first row of grating structures, and the calculation method of "c" is c=b, in which b refers to the width of a sub-pixel in a display panel corresponding to the grating structure. The first row of grating structures of the $i_{th}$ period are shift to the left by the distance "d" compared with the first row of grating structures of the first period, and the calculation method of d is: d=2(i−1)b, in which i is an integer, i≥2, and b refers to the width of a sub-pixel in the display panel.

The above mentioned grating can be manufactured in various methods. For instance, the grating can be formed by a printed film structure or formed by a patterning process with a black matrix resin. For instance, the grating comprises a base substrate and a grating pattern formed on the base substrate. The base substrate is, for instance, a glass substrate, a quartz substrate and the like. In addition, the grating (liquid crystal grating) may also be formed by various kinds of LCD devices, e.g., twisted nematic liquid crystal display (TN-LCD) devices, to display a plurality of black stripes under static driving. For instance, the TN-LCD device comprises two substrates and a liquid crystal layer disposed between the two substrates. The two substrates are respectively provided with a transparent electrode layer on a surface facing the liquid crystal layer in the middle. At least one transparent electrode layer includes a plurality of parallel strip electrodes. The transparent electrode layers will drive the liquid crystal layer in the middle to form alternately dark and bright stripes (namely the grating) after being electrified (applied with a voltage).

One embodiment of the present invention provides a stepped grating (step-like grating), which can be matched with a pixel array of a display device, reduce the width of alternately dark and bright stripes formed by interference when light emitted by sub-pixels on the display panel runs through the black matrix and the grating array, reduce the width to exceed the human-eye recognition capability, and hence effectively reduce the Moire phenomenon.

Preferably, in the minimum cycle period of the grating, the height of the first row of grating structures is one-half the height of the second row of grating structures; or the height of the first row of grating structures is twice the height of the second row of grating structures.

As for the pixel array on the display panel specifically, the first row of grating structures of the grating are arranged corresponding to one row of sub-pixels of the display panel, and the second row of grating structures of the grating are arranged corresponding to another two adjacent rows of sub-pixels of the display panel. Or the first row of grating structures of the grating are arranged corresponding to two adjacent rows of sub-pixels of the display panel, and the second row of grating structures of the grating are arranged corresponding to another row of sub-pixels of the display panel.

Figure 4:
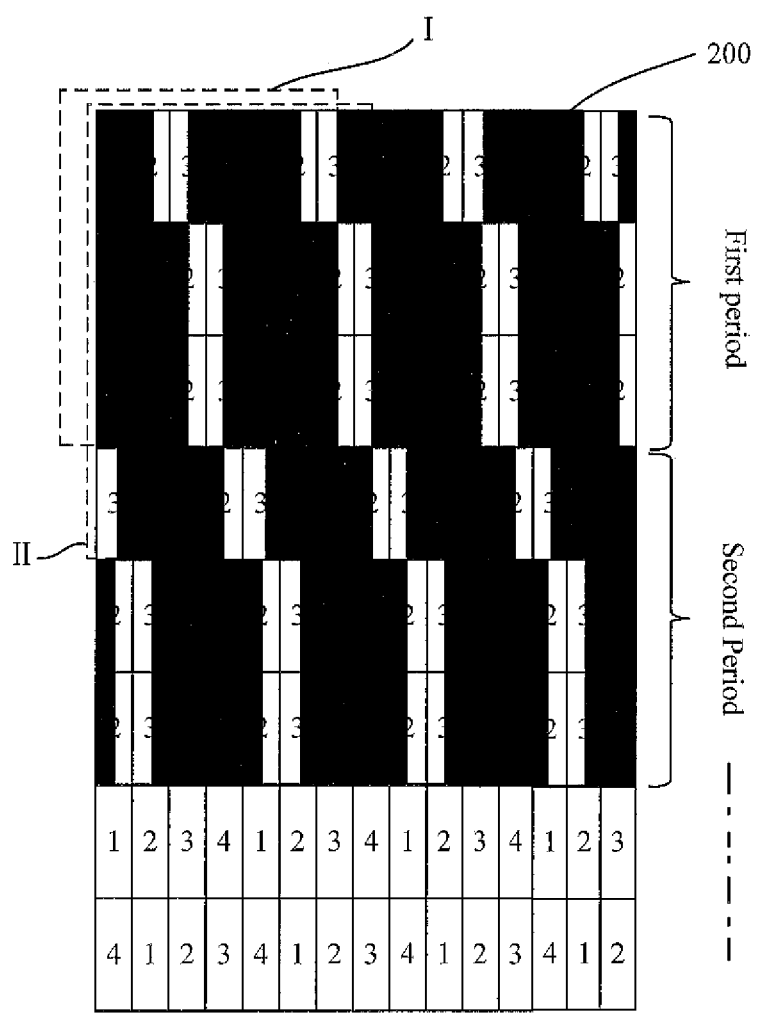
FIG. 4 is a schematic diagram 1 illustrating the position relationship between the grating provided by the first embodiment of the present invention and a pixel array.
Figure 5:
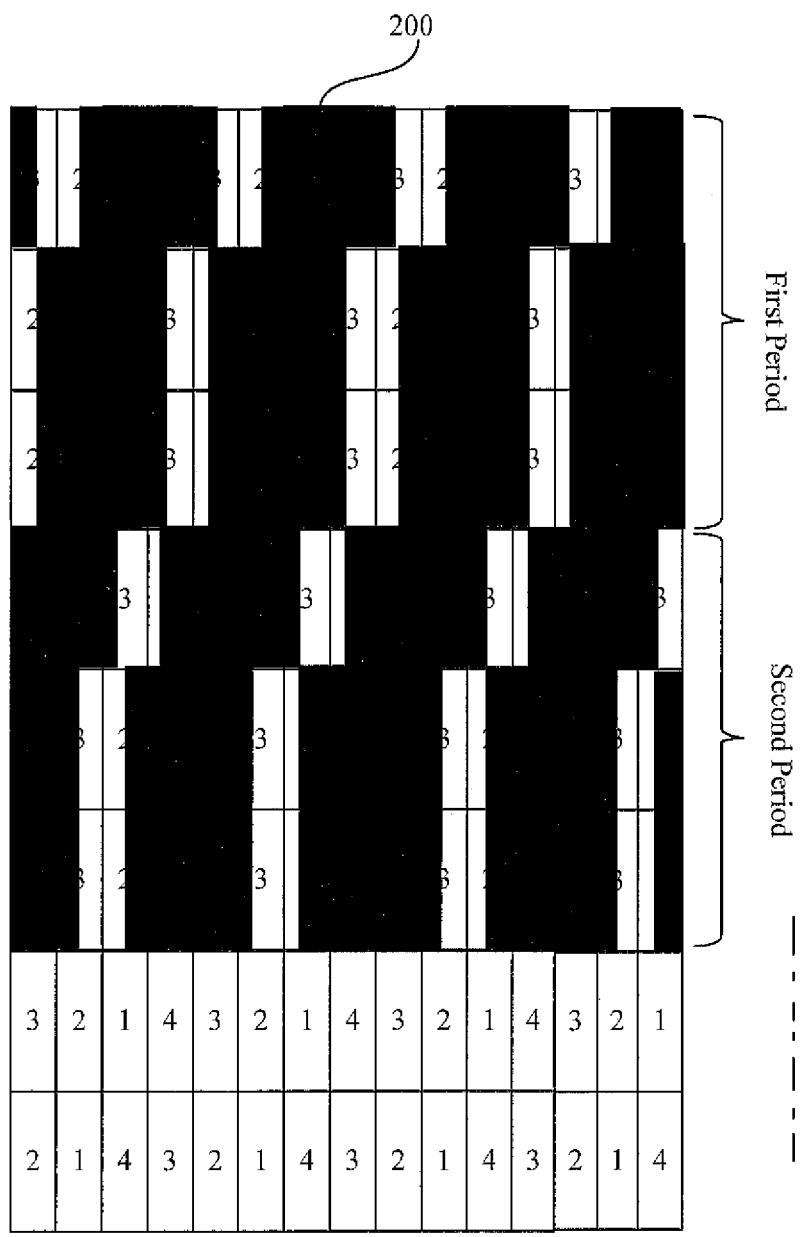
FIG. 5 is a schematic diagram 2 illustrating the position relationship between the grating provided by the first embodiment of the present invention and the pixel array.

Herein, "left" and "right" refer to the direction perpendicular to the stripe extension direction of the grating, for instance, the horizontal direction in FIGS. 4 and 5.

Figure 2:
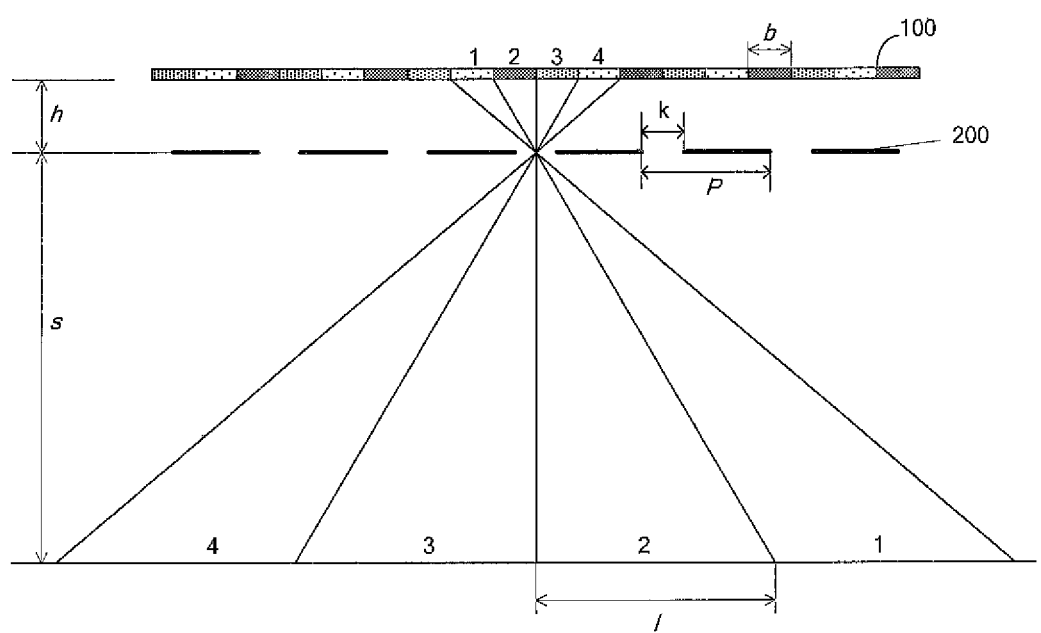
FIG. 2 is a schematic diagram illustrating glasses-free 3D display.

As illustrated in FIG. 2, a grating 200 provided by one embodiment of the present invention is matched with a pixel array on a display panel (for instance, a pixel array on a color filter substrate 100; an array substrate, arranged opposite to the color filter substrate, in the display panel is not shown in the figure). According to the law of triangle, $$\frac{k}{b} = \frac{s}{s+h};$$

$$\frac{p}{nb} = \frac{s}{s+h};$$

$$\frac{b}{l} = \frac{h}{s};$$

-continued $$\text{thus } p = \frac{nbs}{s+h}$$

is deducted; and $$k = \frac{bs}{s+h}$$

may also be deducted, in which "n" refers to the number of 3D display views (the number of different views displayed on the display panel and viewed by an viewer); "b" refers to the width of a sub-pixel in the display panel; "s" refers to the vertical distance from the human eye to the grating; "h" refers to the distance between the grating and the pixel array on the display panel; and "1" refers to the interpupillary distance of human eyes.

Moreover, although the grating slit (opening) width k of the grating may be obtained through the above calculation method, the value can also be changed. The value range of the grating slit width k is: $0 \leq k \leq p$, in which "p" refers to the grating pitch (namely period) of the grating.

Another embodiment of the present invention further provides a display device, which comprises the grating and a display panel. The display panel includes a pixel array matched with the grating. The display panel is, for instance, an LCD panel. The LCD panel includes an array substrate and an opposing substrate arranged opposite to each other and a liquid crystal layer interposed between the array substrate and the opposing substrate. The opposing substrate is, for instance, a color filter substrate. When the array substrate is a color-filter on array (COA) substrate, the opposing substrate does not include color filters. The LCD panel may be of any type such as twisted nematic (TN) mode, in-plane switch (IPS) mode and advanced super dimension switch (ADS) mode.

When the number of 3D display views is an even number, namely when n is an even number, the centerline of the grating opening of the grating, close to the central position, along the data line direction (the vertical direction in the figure) coincides with the centerline of the black matrix of sub-pixels, disposed between the n/2 view and the n/2+1 view, at the central position of the pixel array.

In addition, when the number of 3D display views is an odd number, namely when n is an odd number, the centerline of the grating opening of the grating, close to the central position, along the data line direction coincide with the centerline of sub-pixels, disposed in a (n+1)/2 view, at the central position of the pixel array.

Herein, the central position of the grating refers to the position of an intersection of two diagonals of the whole grating, and n refers to the number of 3D display views.

First Embodiment

As illustrated in FIGS. 3 and 4, the description is given to the grating provided by the present invention and the display device comprising the grating by taking the case that the 3D display device adopts four-view pixel arrangement as an example. The number of views of the 3D display device is 4. FIG. 3 is a schematic diagram illustrating the arrangement rule of a pixel array in the embodiment 1. For instance, the marks "1", "2", "3" and "4" respectively correspond to the first view, the second view, the third view and the fourth view. Correspondingly, each rectangle marked by "1", "2", "3" or "4" represents each sub-pixel, displaying corresponding view, in the display panel. The four views can simultaneously display different images (e.g., a left-eye image or a right-eye image) or same image.

FIG. 4 is a schematic diagram illustrating the position relationship between the grating provided by the embodiment of the present invention and the pixel array. The grating 200 comprises a periodical cycle arrangement, namely a periodical cycle grating structure, for instance, the first period, the second period the $i_{th}$ period arranged in sequence, in which "i" is an integer and $i \geq 2$.

The first period of the grating 200, namely the minimum cycle period, includes two rows of grating structures. The two rows of grating structures have a same grating pitch p and a same grating slit width k.

Figure 6:
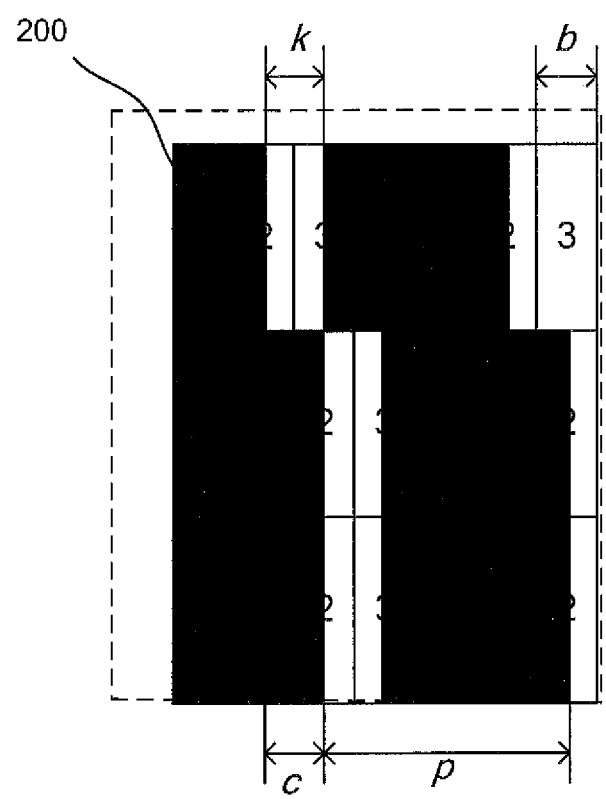
FIG. 6 is a partial enlarged view of section I in FIG. 4.

As illustrated in FIG. 6, the second row of grating structures is shift to the right by the distance "c" compared with the first row of grating structures, and c=b, in which "b" refers to the width of a sub-pixel in the display panel.

Figure 7:
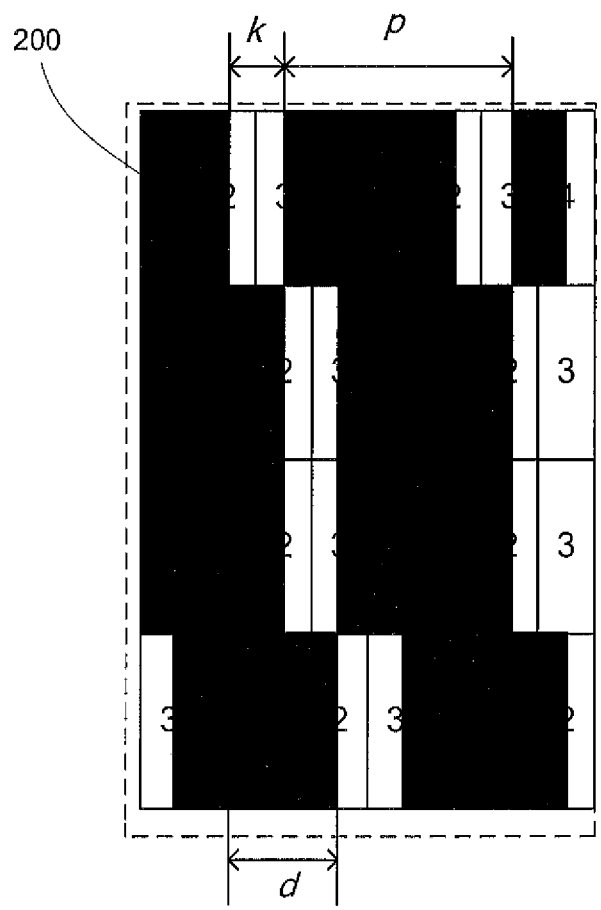
FIG. 7 is a partial enlarged view of section II in FIG. 4.

As illustrated in FIG. 7, the first row of grating structures of the second period are shift to the right by the distance "d" compared with the first row of grating structures of the first period, and d=2b; the first row of grating structures of the third period are shift to the right by the distance "d" compared with the first row of grating structures of the first period, and d=4b; the first row of grating structures of the fourth period are shift to the right by the distance "d" compared with the first row of grating structures of the first period, and d=6b; . . . the first row of grating structures of the $i_{th}$ period are shift to the right by the distance "d" compared with the first row of grating structures of the first period, and d=2(i−1)b, in which i is an integer and $i \geq 2$.

As illustrated in FIG. 4, the first row of grating structures of each period are arranged corresponding to one row of sub-pixels of the display panel, for instance, the vertical projections of the first row of grating structures and the one row of sub-pixels on the surface of the display panel are overlapped with each other; and the second row of grating structures are arranged corresponding to two adjacent rows of sub-pixels of the display panel, for instance, the vertical projections of both on the surface of the display panel are overlapped with each other. At this point, the height of the first row of grating structures is one-half the height of the second row of grating structures.

The calculation method of the grating pitch p of the grating is:

$$p = \frac{4bs}{s+h};$$

and
the calculation method of the grating slit width k of the grating is:

$$k = \frac{bs}{s+h},$$

in which "b" refers to the width of a sub-pixel in the display panel; "s" refers to the distance from the human eye to the grating; and h refers to the distance between the grating and a pixel array on the display panel. The value range of the grating slit width k is: $0 \leq k \leq p$, in which "p" refers to the grating pitch of the grating.

In addition, the embodiment provides another grating. In the first period of the grating 200, namely the minimum cycle period, the second row of grating structures are shift to the left by the distance "c" compared with the first row of grating structures, and c=b, in which "b" refers to the width of a sub-pixel in the display panel. The first row of grating structures of the second period are shift to the left by the distance "d" compared with the first row of grating structures of the first period, and d=2b; . . . the first row of grating structures of the $i_{th}$ period are shift to the left by the distance "d" compared with the first row of grating structures of the first period, and d=2(i−1)b, in which i is an integer and i≥2. As illustrated in FIG. 5, arrangement matrixes of the sub-pixels of the display panel matched with the grating must have opposite sequence with arrangement matrixes of the sub-pixels corresponding to the first type of grating, and the grating has same function as the first type of grating.

With the structural arrangement of the grating, the grating and the display device provided by the embodiment of the present invention can reduce the width of alternately dark and bright stripes formed by interference when the light emitted by the pixel array on the display panel runs through the black matrix and the grating array, reduce the width of the alternately dark and bright stripes to exceed the human-eye recognition capability, and hence effectively reduce the Moire phenomenon.

Second Embodiment

The embodiment provides a display device, which can be a notebook computer, a mobile phone, a TV, a tablet PC, an LCD panel and the like and comprises the grating and an array substrate. The view on the array substrate adopts four-view mode, namely the views on the display panel are four views. The centerline of the grating opening of the grating, close to the central position, along the data line direction coincide with the centerline of the black matrix of sub-pixels, disposed between views "2" and "3", at the central position of the pixel array.

With the structural arrangement of the grating, the grating and the display device provided by the embodiment of the present invention reduce the width of alternately dark and bright stripes formed by interference when the light emitted by the pixel array on the display panel runs through the black matrix and the grating array, reduce the width of the alternately dark and bright stripes to exceed the human-eye recognition capability, and hence effectively reduce the Moire phenomenon.

The foregoing is only the preferred embodiments of the present invention. Of course, the present invention may further comprise other embodiments. Various corresponding changes and modifications can be made by those skilled in the art on the basis of the present invention without departing from the spirit and essence of the present invention. But corresponding changes and modifications should all fall within the scope of protection of the appended claims of the present invention.

The application claims priority to the Chinese patent application No. 201410038384.6 submitted on Jan. 26, 2014. The disclosure content of the Chinese patent application is incorporated herein by reference as part of the application.

The invention claimed is:

1. A grating, comprising a periodical cycle arrangement, wherein a first period of the grating is taken as the minimum cycle period and includes two rows of grating structures which have a same grating pitch and a same grating slit width; in the first period, the second row of grating structures are shift to the right with respect to a display panel by a distance "c" compared with the first row of grating structures, and the calculation method of "c" is: c=b, in which "b" refers to a width of a sub-pixel in a display panel corresponding to the grating; and the first row of grating structures of the $i_{th}$ period are shift to the right by a distance "d" compared with the first row of grating structures of the first period, and the calculation method of "d" is d=2(i−1)b, in which "i" is an integer and i≥2;

or in the first period, the second row of grating structures are shift to the left with respect to the display panel by the distance "c" compared with the first row of grating structures, and the calculation method of "c" c=b, in which "b" refers to the width of a sub-pixel in a display panel corresponding to the grating; and the first row of grating structures of the $i_{th}$ period are shift to the left by the distance "d" compared with the first row of grating structures of the first period, and the calculation method of "d" is: d=2(i−1)b, in which "i" is an integer and i≥2, wherein in the minimum cycle period, a height of the first row of grating structures is one-half a height of the second row of grating structures; or the height of the first row of grating structures is twice the height of the second row of grating structures.

2. The grating according to claim 1, wherein the calculation method of a grating pitch p of the grating is as follows:

$$p = \frac{nbs}{s+h},$$

in which "n" refers to the number of 3D display views; "s" refers to the distance from the human eye to the grating; and "h" refers to the distance between the grating and a pixel array on the display panel.

3. The grating according to claim 2, wherein the calculation method of a grating slit width k of the grating is as follows:

$$k = \frac{bs}{s+h}.$$

4. The grating according to claim 3, wherein a value range of the grating slit width k is: 0≤k≤p.

5. A display device, comprising the grating according to claim 1 and a display panel including a pixel array matched with the grating.

6. The display device according to claim 5, wherein when a number of 3D display views of the display device is an even number, a centerline of a grating opening of the grating, close to a central position, along a data line direction coincides with a centerline of a black matrix of sub-pixels, disposed between a n/2 view and a n/2+1 view, at the central position of the pixel array, in which "n" refers to the number of 3D display views.

7. The display device according to claim 5, wherein when a number of 3D display views of the display device is an odd number, a centerline of a grating opening of the grating, close to a central position, along a data line direction coincides with a centerline of sub-pixels, disposed in a (n+1)/2 view, in the central position of the pixel array, in which "n" refers to the number of 3D display views.

* * * * *